(12) United States Patent
Ohnishi (10) Patent No.: US 7,692,714 B2
(45) Date of Patent: Apr. 6, 2010

(54) IMAGING SYSTEM, IMAGING APPARATUS, AND METHOD FOR CONTROLLING THE IMAGING APPARATUS

(75) Inventor: Motoo Ohnishi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 387 days.

(21) Appl. No.: 11/741,983

(22) Filed: Apr. 30, 2007

(65) Prior Publication Data

US 2007/0280549 A1    Dec. 6, 2007

(30) Foreign Application Priority Data

Jun. 2, 2006    (JP) ............... 2006-155174

(51) Int. Cl.
*G03B 13/00* (2006.01)
*H04N 5/222* (2006.01)
(52) U.S. Cl. ............ 348/350; 348/349; 348/351; 348/333.03
(58) Field of Classification Search .......... 348/349–350
See application file for complete search history.

(56) References Cited

U.S. PATENT DOCUMENTS

| 5,146,261 | A | * | 9/1992 | Soshi | 396/93 |
|---|---|---|---|---|---|
| 5,384,615 | A | * | 1/1995 | Hsieh et al. | 396/84 |
| 5,629,735 | A | * | 5/1997 | Kaneda et al. | 348/350 |
| 6,081,670 | A | * | 6/2000 | Madsen et al. | 396/88 |
| 6,408,140 | B1 | * | 6/2002 | Malloy Desormeaux | 396/429 |
| 6,571,023 | B1 | | 5/2003 | Aizawa et al. | |
| 6,710,806 | B1 | * | 3/2004 | Satoh | 348/350 |
| 7,151,570 | B2 | * | 12/2006 | Kaneda | 348/360 |
| 7,193,651 | B2 | * | 3/2007 | Kato | 348/349 |
| 7,417,683 | B2 | * | 8/2008 | Hirai | 348/350 |
| 2001/0012072 | A1 | * | 8/2001 | Ueno | 348/333.02 |
| 2005/0117049 | A1 | * | 6/2005 | Suzuki | 348/345 |
| 2007/0274703 | A1 | * | 11/2007 | Matsuda | 396/264 |
| 2007/0279492 | A1 | * | 12/2007 | Ohnishi | 348/143 |

FOREIGN PATENT DOCUMENTS

| JP | 9-139878 | A | | 5/1997 |
|---|---|---|---|---|
| JP | 9-252422 | A | | 9/1997 |
| JP | 11-295826 | A | | 10/1999 |
| JP | 2005-277907 | | * | 10/2005 |

* cited by examiner

*Primary Examiner*—Ngoc-Yen T Vu
(74) *Attorney, Agent, or Firm*—Canon U.S.A., Inc. I.P. Division

(57) ABSTRACT

An overall in-focus position is calculated based on an in-focus position of each clip image, an image size of each clip image, and an image size of each output image. Focus control for an imaging apparatus is performed based on the calculated overall in-focus position.

10 Claims, 12 Drawing Sheets

IMAGING SYSTEM, IMAGING APPARATUS, AND METHOD FOR CONTROLLING THE IMAGING APPARATUS

BACKGROUND OF THE INVENTION

1. Field of the Invention

The present invention relates to a technique capable of clipping a plurality of partial images from a captured image and outputting an image with a converted image size.

2. Description of the Related Art

An image processing system is capable of clipping a plurality of partial images from a captured image, converting an image size of each clip image, and producing an output image with a converted image size. As discussed in Japanese Patent Application Laid-Open No. 9-139878, a special lens having plural in-focus positions can be used to capture an image including both a short-range view and a distant view which are in focused conditions.

As discussed in Japanese Patent Application Laid-Open No. 9-252422 or in Japanese Patent Application Laid-Open No. 11-295826, a camera apparatus can obtain an image including both a short-range view and a distant view being in focused conditions with a half mirror or a prism and plural image sensors disposed at different positions, thereby simultaneously capturing images having different in-focus positions and obtaining an omnifocal image by combining the captured images.

However, according to the image processing system discussed in Japanese Patent Application Laid-Open No. 9-139878, a captured image includes a plurality of in-focus positions. Therefore, an actual image includes defocused components at respective focusing positions. Completely removing such defocused components is difficult even when the image is subjected to image processing. The image quality of a processed image tends to deteriorate.

Furthermore, as discussed in Japanese Patent Application Laid-Open No. 9-252422 or in Japanese Patent Application Laid-Open No. 11-295826, a camera apparatus including a plurality image sensors and expensive constituent parts, such as a half mirror and a prism, requires higher manufacturing costs compared to a conventional camera apparatus including a set of an optical system (lens) and an image sensor.

SUMMARY OF THE INVENTION

Exemplary embodiments of the present invention are directed to camera parameter control for enabling an optical system to be focused on plural output images when a camera system clips a plurality partial images from a captured image, converts an image size of each clip image, and produces an output image with a converted image size.

According to an aspect of the present invention, an imaging system is capable of clipping a plurality of partial images from an image captured by an imaging apparatus, converting an image size of each clip image, and producing an output image with a converted image size. The imaging system includes a calculation unit configured to calculate an overall in-focus position based on an in-focus position of each clip image, an image size of each clip image, and an image size of each output image; and focus control unit configured to perform focus control for the imaging apparatus based on the overall in-focus position calculated by the calculation unit.

Additionally, a method is provided for controlling an imaging apparatus capable of clipping a plurality of partial images from an image, converting an image size of each clip image, and producing an output image with a converted image size. The method includes calculating an overall in-focus position based on an in-focus position of each clip image, an image size of each clip image, and an image size of each output image, and performing focus control for the imaging apparatus based on the calculated overall in-focus position.

Moreover, according to another aspect of the present invention, a medium is provided storing instructions which, when executed by a computer, causes the imaging apparatus to clip a plurality partial images from an image, convert an image size of each clip image, and produce an output image with a converted image size. Here, the medium includes instructions for calculating an overall in-focus position based on an in-focus position of each clip image, an image size of each clip image, and an image size of each output image, and instructions for performing a focus control for the imaging apparatus based on the calculated overall in-focus position.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

The following description of exemplary embodiments is merely illustrative in nature and is in no way intended to limit the invention, its application, or uses.

It is noted that throughout the specification, similar reference numerals and letters refer to similar items in the following figures, and thus once an item is described in one figure, it may not be discussed for following figures.

Exemplary embodiments, features and aspects of the present invention will now herein be described in detail below with reference to the drawings.

First Exemplary Embodiment

A principle of a camera parameter control according to a first exemplary embodiment of the present invention will be described.

Figure 1:
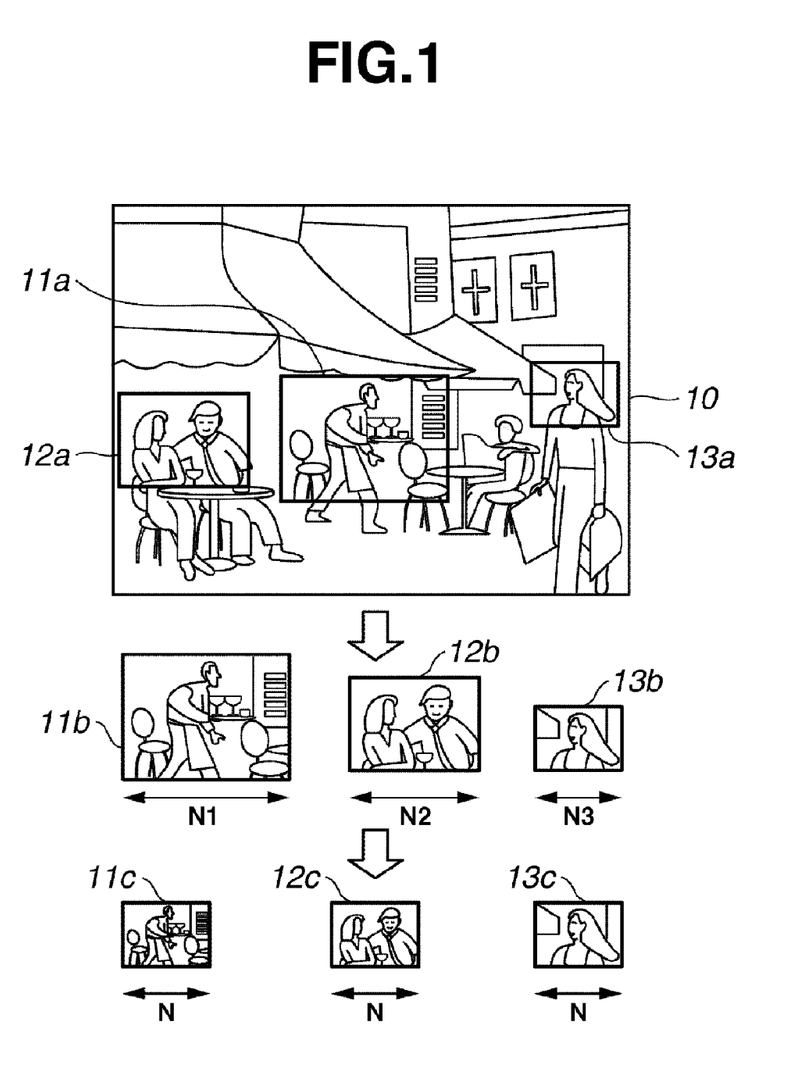
FIG. 1 illustrates exemplary image processing for obtaining output images from a captured image.

FIG. 1 illustrates exemplary image processing for obtaining a plurality of output images from a captured image. According to an example illustrated in FIG. 1, the camera parameter control includes a process for clipping partial images (clip images) $11b$, $12b$, and $13b$ from field ranges $11a$, $12a$, and $13a$ of a captured image 10 designated by a user. At this moment, respective clip images $11b$, $12b$, and $13b$ have the same aspect ratio and different image sizes $N_1$, $N_2$, and $N_3$.

Furthermore, the camera parameter control includes a process for converting the clip images $11b$, $12b$, and $13b$ into images having a constant image size N and outputting the converted images as output images $11c$, $12c$, and $13c$. According to an exemplary embodiment, the processing for converting the image size can be realized by a bi-linear interpolation or a bi-cubic convolution which can effectively suppress deterioration in the image quality.

The present embodiment presumes that the size of a defocused state on the captured image 10 (hereinafter, referred to as a circle-of-confusion diameter) is uniform irrespective of the pixel position. Furthermore, the present embodiment presumes that deterioration in the image caused by the conversion of the image size is negligible.

In this case, the circle-of-confusion diameters on respective output images $11c$, $12c$, and $13c$ are inversely proportional to the image sizes of the clip images $11b$, $12b$, and $13b$ which have not yet been subjected to image size conversion.

Figure 2:
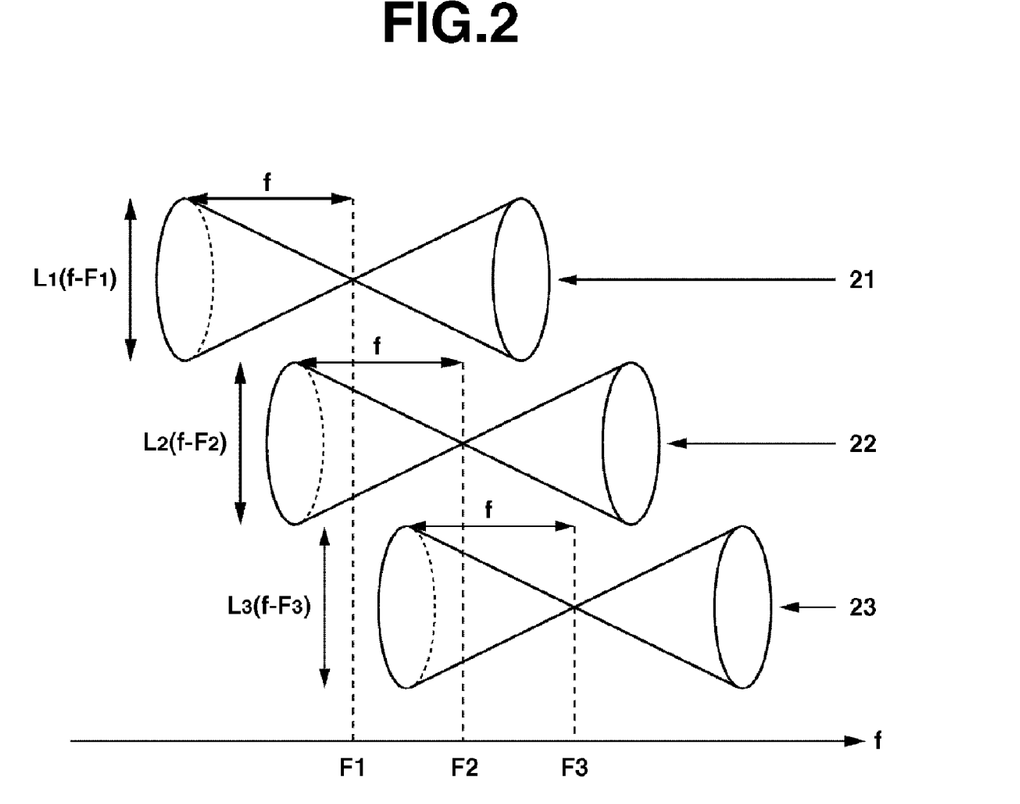
FIG. 2 illustrates exemplary circles of confusion on respective clip images which are variable depending on a focusing position.

FIG. 2 illustrates exemplary circles 21, 22, and 23 of confusion on respective clip images $11b$, $12b$, and $13b$, which are variable depending on a focusing position f. The circle-of-confusion diameters become 0 at respective in-focus position $F_1$, $F_2$, and $F_3$ and linearly change depending on the focusing position f. Therefore, the circle-of-confusion diameters $L_1(f)$, $L_2(f)$, and $L_3(f)$ at the focusing position f on respective clip images $11b$, $12b$, and $13b$ can be expressed by the following function (1) which includes a constant k, where k is a constant representing a gradient of the change in the circle-of-confusion diameter relative to a deviation from the in-focus position ($F_1$, $F_2$, and $F_3$) on the captured image 10.

$$L_1(f) = k|f - F_1|$$

$$L_2(f) = k|f - F_2|$$

$$L_3(f) = k|f - F_3| \quad (1)$$

Figure 3:
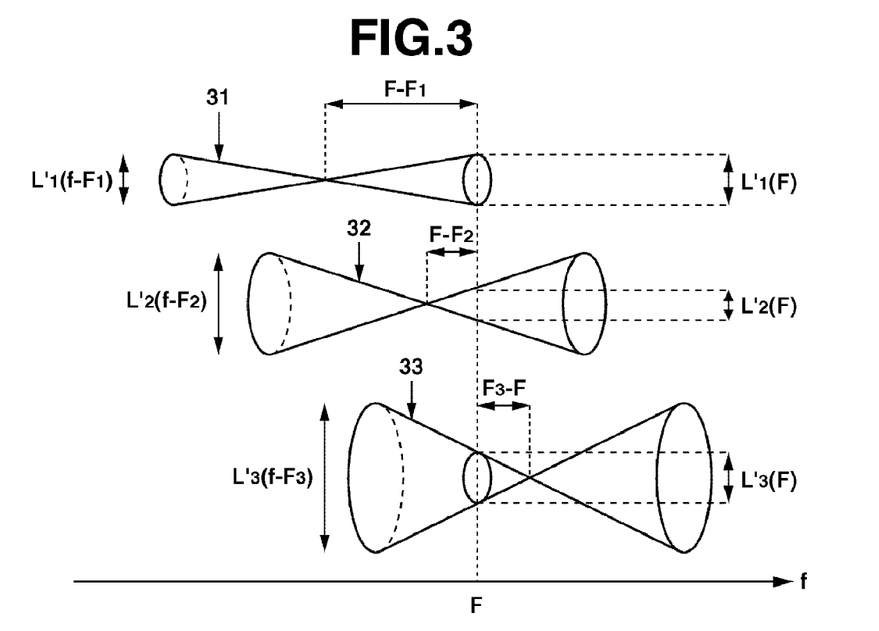
FIG. 3 illustrates exemplary circles of confusion on respective output images which are variable depending on the focusing position.

FIG. 3 illustrates exemplary circles 31, 32, and 33 of confusion on respective output images $11c$, $12c$, and $13c$, which are variable depending on the focusing position f. The output images $11c$, $12c$, and $13c$ are resized at ratios $N/N_1$, $N/N_2$, and $N/N_3$ relative to the clip images $11b$, $12b$, and $13b$, respectively. Accordingly, the circle-of-confusion diameters $L'_1(f)$, $L'_2(f)$, and $L'_3(f)$ on respective output images $11c$, $12c$, and $13c$ can be expressed by the following function (2) which is dependent on the focusing position f.

$$L'_1(f) = (N/N_1) \cdot L_1(f)$$

$$L'_2(f) = (N/N_2) \cdot L_2(f)$$

$$L'_3(f) = (N/N_2) \cdot L_3(f) \quad (2)$$

Figure 8:
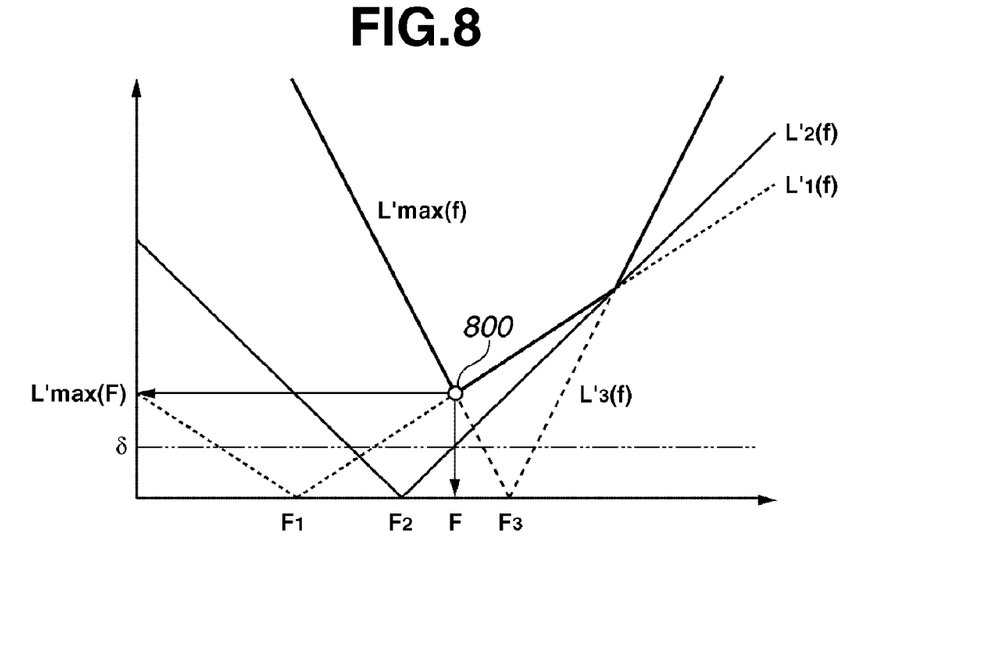
FIG. 8 is a graph illustrating a function L'max(f) defining the largest value among circle-of-confusion diameters $L'_1(f)$, $L'_2(f)$, and $L'_3(f)$ on output images at the in-focus position f when the aperture value before change is Ic.

Here, as illustrated in FIG. 8, the present embodiment defines a function L'max(f) which varies depending on the focusing position f and represents the largest value among the circle-of-confusion diameters $L'_1(f)$, $L'_2(f)$, and $L'_3(f)$ on respective output images $11c$, $12c$, and $13c$. The function L'max(f) has a smallest value at a focusing position F.

According to the example illustrated in FIG. 8, the function L'max(f) is equal to the circle-of-confusion diameter $L'_1(f)$ on the output image $11c$ when the focusing position is within an intermediate region and equal to the circle-of-confusion diameter $L'_3(f)$ on the output image $13c$ when the focusing position is smaller or greater than the intermediate region.

Accordingly, if the following formula (3) is established, the following formula (4) can be derived from the formulas (1), (2), and (3).

$$L'\max(f) = L'_1(f) = L'_3(f) \quad (3)$$

$$F = \frac{N_1 \cdot F_3 + N_3 \cdot F_1}{N_1 + N_3} \quad (4)$$

Figure 4:
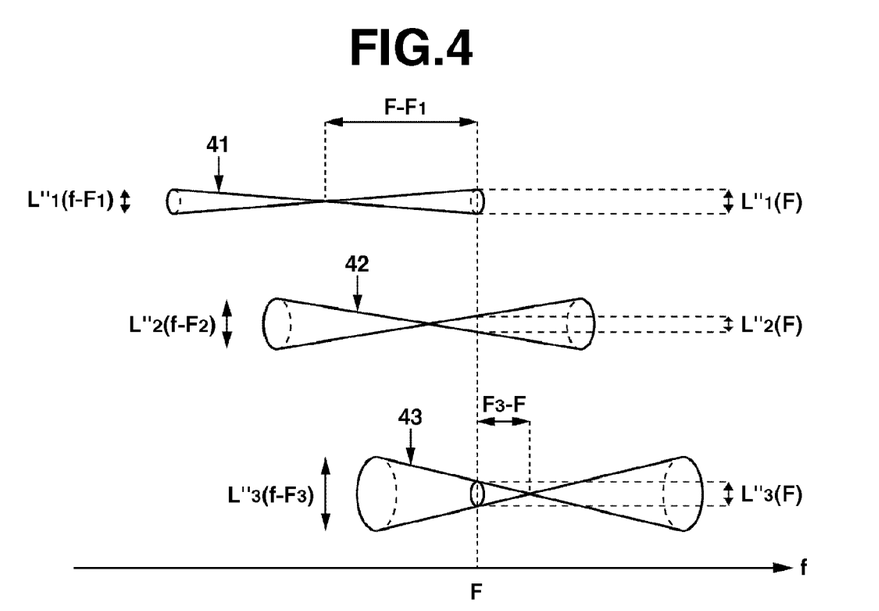
FIG. 4 illustrates exemplary circles of confusion on the output images after the aperture value has been changed, which are variable depending on the focusing position.

FIG. 4 illustrates exemplary circles 41, 42, 43 of confusion on the output images $11c$, $12c$, and $13c$ after the aperture value has been changed, which are variable depending on the focusing position f.

If the aperture value (i.e., F number) changes from a present aperture value Ic to another aperture value I, the circle-of-confusion diameters $L''_1(f)$, $L''_2(f)$, and $L''_3(f)$ on the output images $11c$, $12c$, and $13c$ are reduced in inverse proportion to the aperture value as defined by the following function (5).

$$L''_1(f) = \frac{I_C}{I} \cdot L'_1(f)$$

$$L''_2(f) = \frac{I_C}{I} \cdot L'_2(f)$$

$$L''_3(f) = \frac{I_C}{I} \cdot L'_3(f) \quad (5)$$

If the circle-of-confusion diameter becomes smaller than the diameter of an allowable circle of confusion, it can be regarded that the optical system is in a focused condition.

Hence, the camera parameter control according to the present embodiment includes a process for controlling the aperture value to an appropriate value I so that the largest value L'max(F) among the plural circle-of-confusion diameters on respective output images $11c$, $12c$, and $13c$ at the focusing position F becomes equal to the diameter δ of an allowable circle of confusion on respective output images 11c, 12c, and 13c.

With the above-described camera parameter control, the present embodiment enables the optical system to be focused on respective output images 11c, 12c, and 13c without excessively changing the aperture value.

The constant k in the formula (1) is dependent on the aperture value and changes in inverse proportion to the aperture value. Therefore, when $I_k$ represents an aperture value at the constant k and δ represents the diameter of an allowable circle of confusion on the output images 11c, 12c, and 13c, the following formula (6) can be derived from the formulas (1) through (5) for obtaining a target (smallest) aperture value I so that the optical system can be focused on all of the output images 11c, 12c, and 13c.

$$I = \frac{N \cdot k \cdot |F_3 - F_1|}{\delta \cdot (N_1 + N_3)} \cdot I_k \quad (6)$$

When the in-focus position F and the aperture value I are adjusted to the values calculated by the formulas (4) and (6), the optical system can be focused on all of the output images 11c, 12c, and 13c without excessively changing the aperture value.

In particular, when the depth of field of an optical system is deep, an object positioned at a distant point can be captured based on only a focus control without adjusting a diaphragm so that the optical system can be focused on all of the output images 11c, 12c, and 13c.

As apparent from the formulas (4) and (6), the in-focus position F and the aperture value I can be easily calculated based on the constants k, $I_k$, and δ as well as the in-focus positions and the image sizes of respective clip images 11b, 12b, and 13b. Accordingly, the above-described camera parameter control according to the present embodiment can be easily implemented by adding a camera parameter calculation algorithm to various kinds of camera apparatus and camera systems.

Figure 5:
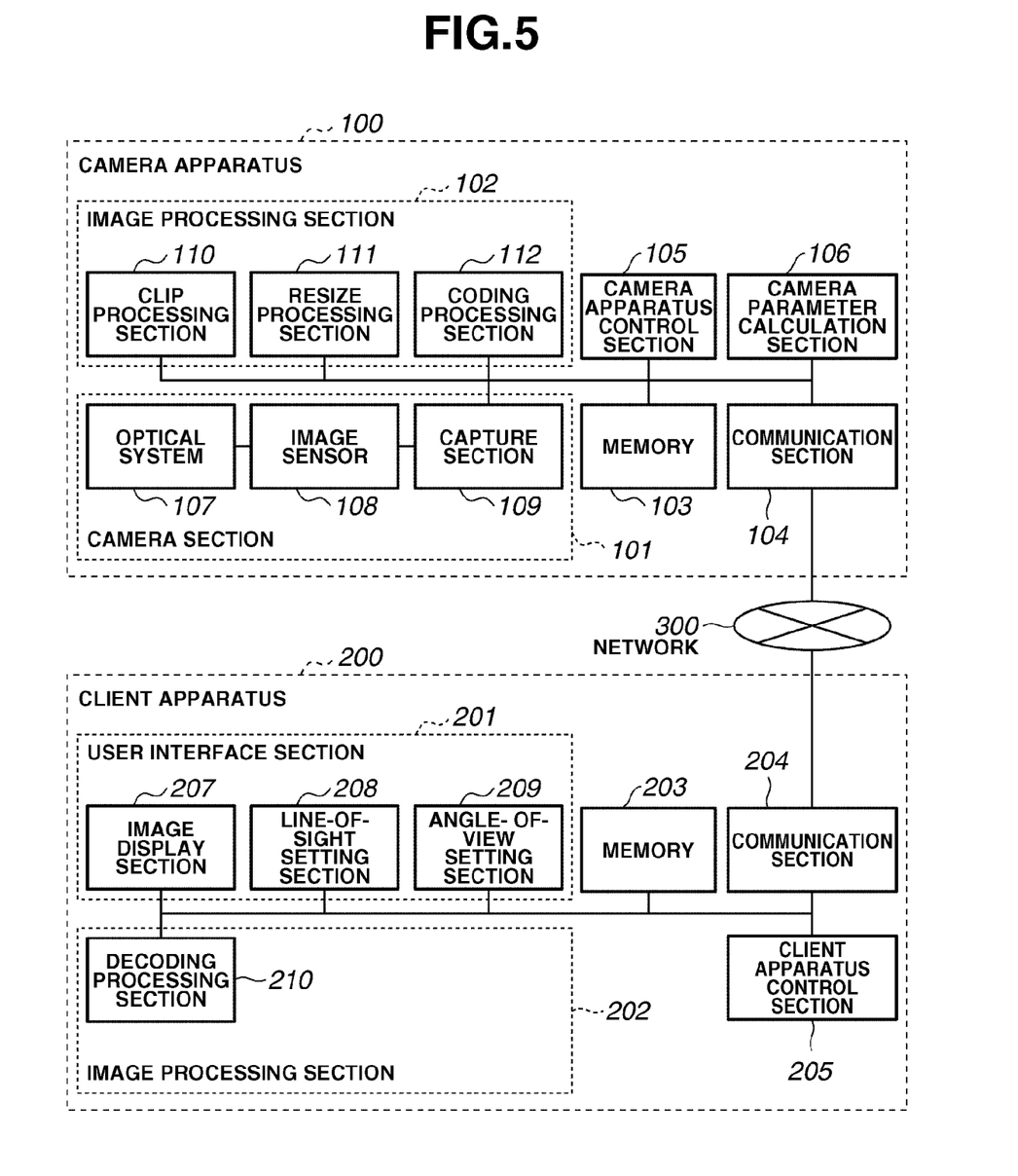
FIG. 5 is a block diagram illustrating a camera system according to a first exemplary embodiment.

FIG. 5 illustrates an internal arrangement of an exemplary camera system including a camera apparatus that can perform processing for clipping images from a captured image and resizing the clip images.

The camera apparatus 100 includes a camera section 101 that can capture an image, an image processing section 102, a memory 103 that temporarily stores various data including image data, a communication section 104 that transmits/receives data via a network 300 to/from a client apparatus 200, a camera apparatus control section 105 that manages internal conditions of the camera apparatus 100 and connecting conditions of the client apparatus 200 and also controls various sections in the camera apparatus 100, and a camera parameter calculation section 106 that can calculate camera parameters such as focus, aperture value, shutter speed, and gain.

The camera section 101 includes an optical system 107, an image sensor 108, and a capture section 109. The image processing section 102 includes a clip processing section 110 that can clip a designated portion on a captured image, a resize processing section 111 that can resize or resample an image, and a coding processing section 112 that can encode image data to compress the amount of data to be transmitted to the client apparatus 200.

The image data to be delivered to the client apparatus 200 are JPEG data or JPEG2000 data for a still image or MPEG2 data or MPEG4 data for a moving image. The coding processing section 112 performs codec processing including encoding for such data.

The client apparatus 200 includes a user interface section 201, an image processing section 202, a memory 203 that temporarily stores various data including image data, a communication section 204 that can transmit/receive data via the network 300 to/from the camera apparatus 100, and a client apparatus control section 205 that can manage internal conditions of the client apparatus 200 and control each section in the client apparatus 200.

The user interface section 201 includes an image display section 207 that displays an output image, a line-of-sight setting section 208 that receives the line of sight (LOS) of a user and indicates LOS information currently set by the camera apparatus, and an angle-of-view setting section 209 that receives an angle of view from a user and indicates an angle of view currently set by the camera apparatus 100. The image processing section 202 includes a decoding processing section 210 that can decode the image data received from the camera apparatus 100.

For example, a dedicated chip, a central processing unit (CPU) or a digital signal processor (DSP) can execute software processing comparable to the processing sections in the image processing section 102 of the camera apparatus 100 and the image processing section 202 of the client apparatus 200. In other words, the processing sections in the image processing section 102 or 202 need not be independent from each other.

Furthermore, according to the camera system illustrated in FIG. 5, only the camera apparatus 100 includes the resize processing section 111 and delivers a resized image to the client apparatus 200. The image display section 207 in the client apparatus 200 displays an output image having the same image size as the image delivered from the camera apparatus 100.

If the client apparatus 200 includes a resize processing section, the client apparatus 200 can change the image size of a received image. In this case, the camera apparatus 100 can remove the resize processing section 111.

Figure 6:
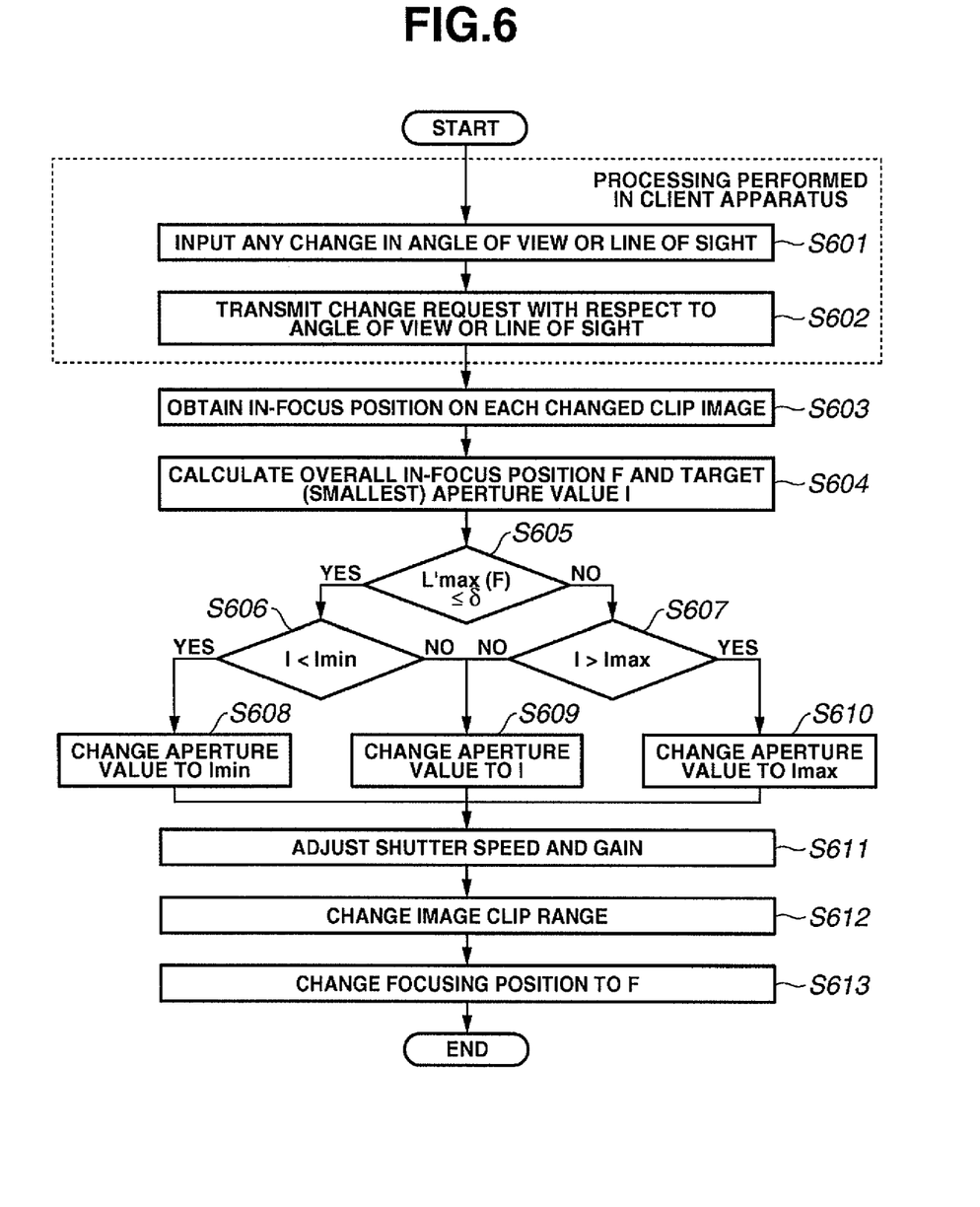
FIG. 6 is a flowchart illustrating exemplary processing performed by the camera system according to the first exemplary embodiment, when a field range has changed.

FIG. 6 is a flowchart illustrating exemplary processing performed by the camera system according to the present embodiment, when a field range has changed.

First, the client apparatus 200 performs the following processing. In step S601, the line-of-sight setting section 208 inputs a change in the line of sight of a user and the angle-of-view setting section 209 inputs a change in the angle of view.

Then, in step S602, the client apparatus control section 205 receives the input changes and transmits a change request with respect to the line of sight or the angle of view via the communication section 204 to the camera apparatus 100.

The camera apparatus 100 performs the following processing. In step S603, the camera apparatus control section 105 receives the change request with respect to the line of sight or the angle of view from the client apparatus 200 and obtains an in-focus position of each changed clip image.

The in-focus position of each clip image obtained in step S603 is fundamentally equal to a focusing position of a shooting object in a clip range obtained by the auto-focus function of the camera section 101, or obtained by an external apparatus (e.g., a distance image sensor).

However, if the focusing position can be determined by selecting a preset value (which is registered beforehand) in step S601 in addition to the line-of-sight input or the angle-of-view input, the in-focus position of each clip image may be equal to a preset focusing position.

In step S604, the camera parameter calculation section 106 calculates an overall in-focus position F and a target (smallest) aperture value I capable of focusing on all output images based on the formulas (4) and (6).

In step S605, the camera apparatus 100 determines whether the largest value L'max(F) among the plural circle-of-confusion diameters on the output images at the present aperture value Ic and the focusing position F is equal to or less than the diameter δ of an allowable circle of confusion on the output image.

When the largest value L'max(F) among the plural circle-of-confusion diameters is equal to or less than the diameter δ of an allowable circle of confusion on the output image, a relationship I<Ic is established and therefore the diaphragm can be opened.

When the largest value L'max(F) among the plural circle-of-confusion diameters is greater than the diameter δ of an allowable circle of confusion on the output image, a relationship I>Ic is established and therefore the diaphragm has to be closed. In the camera system according to the present embodiment, the diaphragm is controlled to constantly obtain a smaller aperture value.

Therefore, if a relationship L'max(F)≦δ is satisfied (i.e., YES in step S605), the processing flow proceeds to step S606. On the other hand, if a relationship L'max(F)>δ is satisfied (i.e., NO in step S605), the processing flow proceeds to step S607.

In step S606, the camera apparatus 100 determines whether the aperture value I is less than a settable minimum aperture value Imin. If the aperture value I is equal to or greater than the minimum aperture value Imin (NO in step S606), the camera apparatus 100 sets the aperture value to I (refer to step S609). If the aperture value I is less than the minimum aperture value Imin (YES in step S606), the camera apparatus 100 cannot set the aperture value to I and therefore sets the aperture value to Imin (refer to step S608).

In step S607, the camera apparatus 100 determines whether the aperture value I is greater than a settable maximum aperture value Imax. If the aperture value I is equal to or less than the maximum aperture value Imax (NO in step S607), the camera apparatus 100 sets the aperture value to I (refer to step S609). If the aperture value I is greater than Iman (YES in step S607), the camera apparatus 100 cannot set the aperture value to I and therefore sets the aperture value to Imax (refer to step S610). When the aperture value is set to Imax, a relationship L'max(F)≧δ is satisfied and therefore an output image may be partly defocused.

Through the above-described processing for adjusting (or changing) the aperture value in steps S608 through S610, each output image may be out of an appropriate exposure range. Hence, in step S611, the camera parameter calculation section 106 calculates a proper shutter speed value and a proper gain value. The camera apparatus 100 adjusts the shutter speed and the gain to the calculated values. Therefore, the exposure value can be maintained at an appropriate level.

Then, in step S612, the camera apparatus 100 changes the clip range to a position where the line of sight and the angle of view requested in step S602 can be satisfied. In step S613, the camera apparatus 100 changes the focusing position to the overall in-focus position F calculated in step S604. Then, the processing of this routine is terminated.

Figure 7:
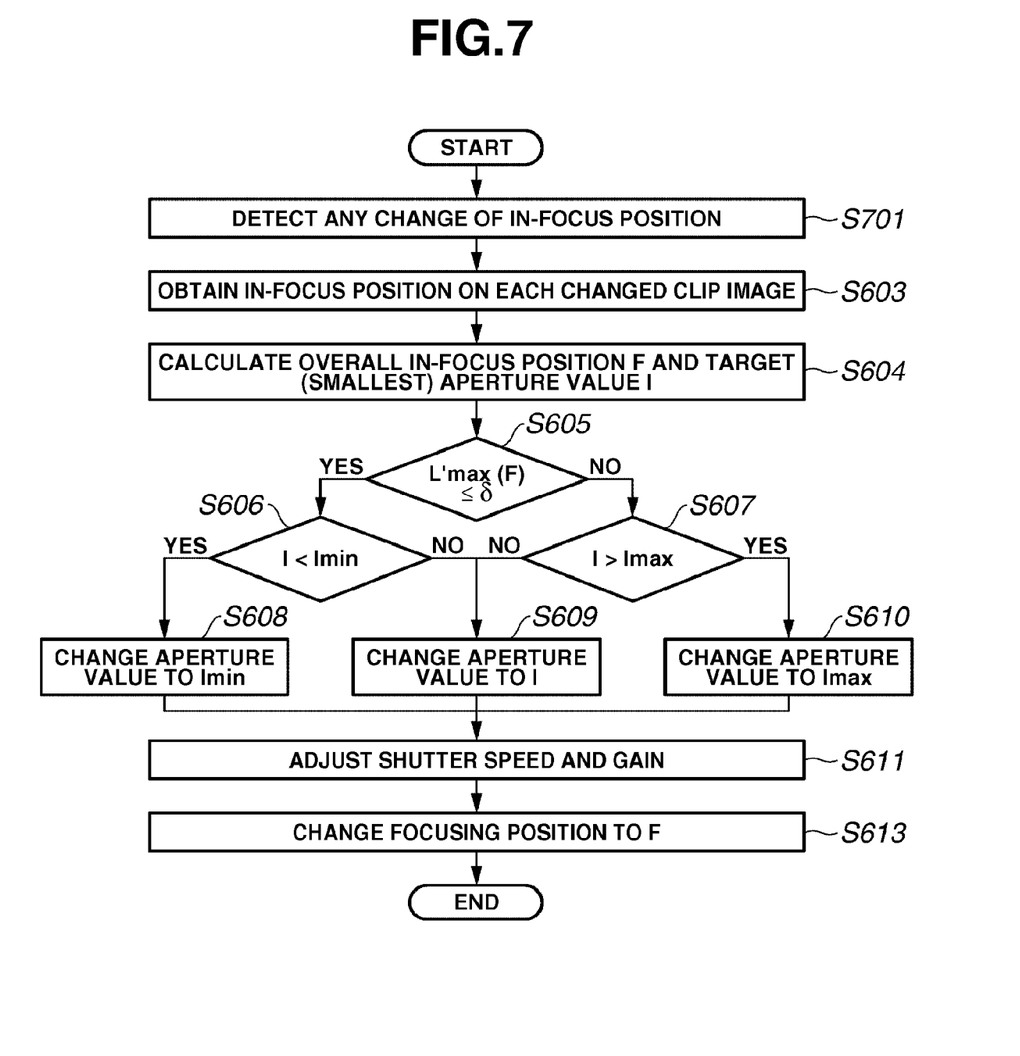
FIG. 7 is a flowchart illustrating exemplary processing performed by the camera system according to the first exemplary embodiment, when an in-focus position has changed in a clip range due to a shift of an object.

FIG. 7 is a flowchart illustrating exemplary processing performed by the camera system according to the present embodiment, when an in-focus position has changed in a clip range due to a shift of an object.

In step S701, the camera system detects a change in the in-focus position. The succeeding steps in the exemplary flowchart illustrated in FIG. 7 are basically similar to steps S603 through S611 and S613 illustrated in FIG. 6. The processing in step S612 can be eliminated because the clip range is not changed.

Figure 9:
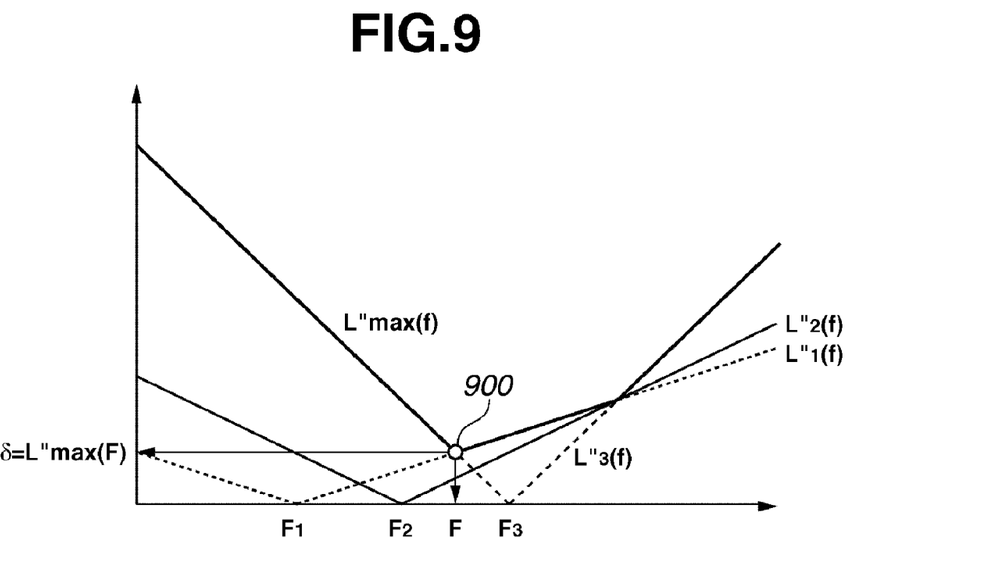
FIG. 9 is a graph illustrating a function L"max(f) defining the largest value among circle-of-confusion diameters $L''_1(f)$, $L''_2(f)$, and $L''_3(f)$ on an output images at the in-focus position f when the aperture value has been changed to I.

FIGS. 8 and 9 illustrate exemplary processing for calculating the overall in-focus position F in step S604 of FIG. 6 and a target (smallest) aperture value I so that the optical system can be focused on all of the output images.

FIG. 8 illustrates the function L'max(f) defining the largest value among the plural circle-of-confusion diameters $L'_1(f)$, $L'_2(f)$, and $L'_3(f)$ on the output images 11c, 12c, and 13c at the in-focus position f when the aperture value is Ic.

According to the example illustrated in FIG. 8, the function L'max(f) has a smallest value at a point 800 where the lines $L'_1(f)$ and $L'_3(f)$ cross each other. The overall in-focus position F is equal to the focusing position at the point 800. According to the example illustrated in FIG. 8, the function L'max(F) at the overall in-focus position F is larger than the diameter δ of an allowable circle of confusion on the output image. Therefore, the camera has to decrease the circle-of-confusion diameter by changing the aperture size of the diaphragm.

FIG. 9 illustrates the function L"max(f) defining a largest value among the plural circle-of-confusion diameters $L''_1(f)$, $L''_2(f)$, and $L''_3(f)$ on the output images 11c, 12c, and 13c at the focusing position f, when the aperture value has been changed to an aperture value I. The relationship defined by the formula (5) is established between L'max(f) and L"max(f).

Therefore, if the aperture value is changed to I, the point 800 where the lines $L'_1(f)$ and $L'_3(f)$ cross each other shifts to a point 900 where the lines $L''_1(f)$ and $L''_3(f)$ cross each other while the focusing position is unchanged. In this case, a relationship δ=L"max(F) can be satisfied. Thus, the formula (6) can be derived and the target aperture value I can be calculated.

Figure 10A:
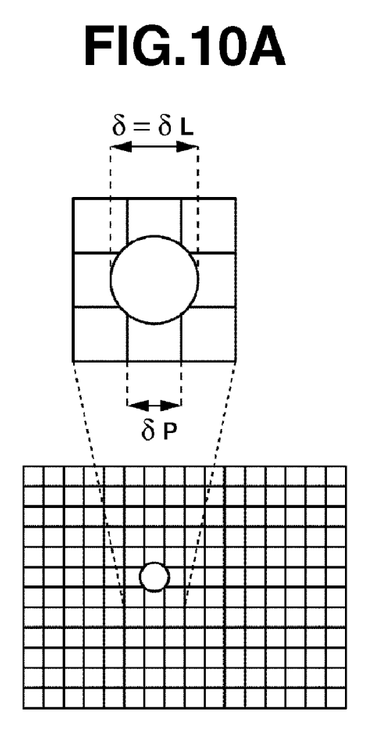
FIGS. 10A and 10B illustrate exemplary determination of a diameter δ of an allowable circle of confusion, in a case where a pixel distance on an output image is large compared to a diameter of an allowable circle of confusion on the output image.
Figure 10B:
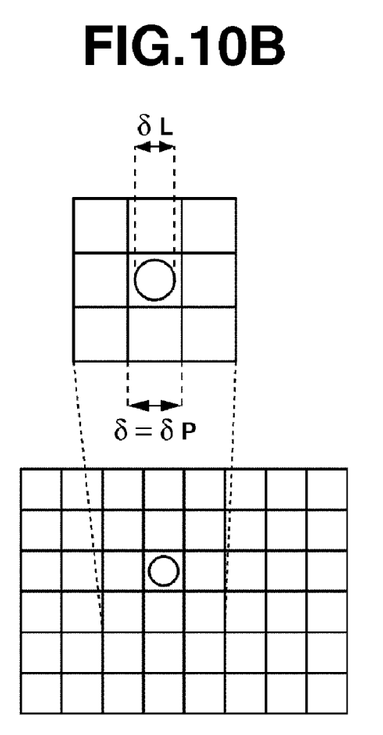

FIGS. 10A and 10B illustrate exemplary determination of the diameter δ of an allowable circle of confusion which is used in the calculation of the overall in-focus position F and the target (smallest) aperture value I so that the optical system can be focused on all of the output images, in a case where a pixel distance on the output image is large compared to the diameter of an allowable circle of confusion on the output image.

In the present embodiment, δP represents a pixel distance on an output image and δL represents a diameter of an allowable circle of confusion, in a case where deterioration of resolution depending on the pixel distance on an output image is not taken into consideration.

When the allowable circle-of-confusion diameter δL is greater than the pixel distance δP (refer to FIG. 10A), a defocus state can be detected even when the circle-of-confusion diameter is approximately equal to δL.

However, when the allowable circle-of-confusion diameter δL is smaller than the pixel distance δP (FIG. 10B), a defocus state cannot be detected when the circle-of-confusion diameter is less than pixel distance δP.

Therefore, the present embodiment sets the diameter δ to be equal to δL when δL≧δP and δP when δL<δP. The present embodiment uses the determined diameter δ (δ=δL when δL≧δP and δ=δP when δL<δP) of an allowable circle of confusion to calculate the overall in-focus position F and the target (smallest) aperture value I so that the optical system can be focused on all of the output images.

Furthermore, when the resize processing is performed to obtain an enlarged output image from a clip image, the resolution may deteriorate depending on the pixel distance on a clip image.

It is presumed that δ'P represents a pixel distance on a clip image and δ'L represents a diameter of an allowable circle of confusion, in a case where deterioration of resolution depending on the pixel distance on a clip image is not taken into consideration. Furthermore, Ni represents an image size of a clip image and N represents an image size of an output image.

The present embodiment sets δL to be equal to N·δ'L/Ni when δL≧δP and sets δL to be equal to N·δ'P/Ni when δL<δP so as to remove calculation errors caused by the deterioration of resolution depending on the pixel distance on a clip image.

Second Exemplary Embodiment

According to the above-described first exemplary embodiment, the circle-of-confusion diameter on a captured image is uniform irrespective of the pixel position. On the other hand, in the second exemplary embodiment, the circle-of-confusion diameter on a captured image is variable depending on the pixel position.

More specifically, the second exemplary embodiment has the following features different from those of the above-described first exemplary embodiment, although the rest of the second exemplary embodiment is similar to that of the first exemplary embodiment.

Figure 11:
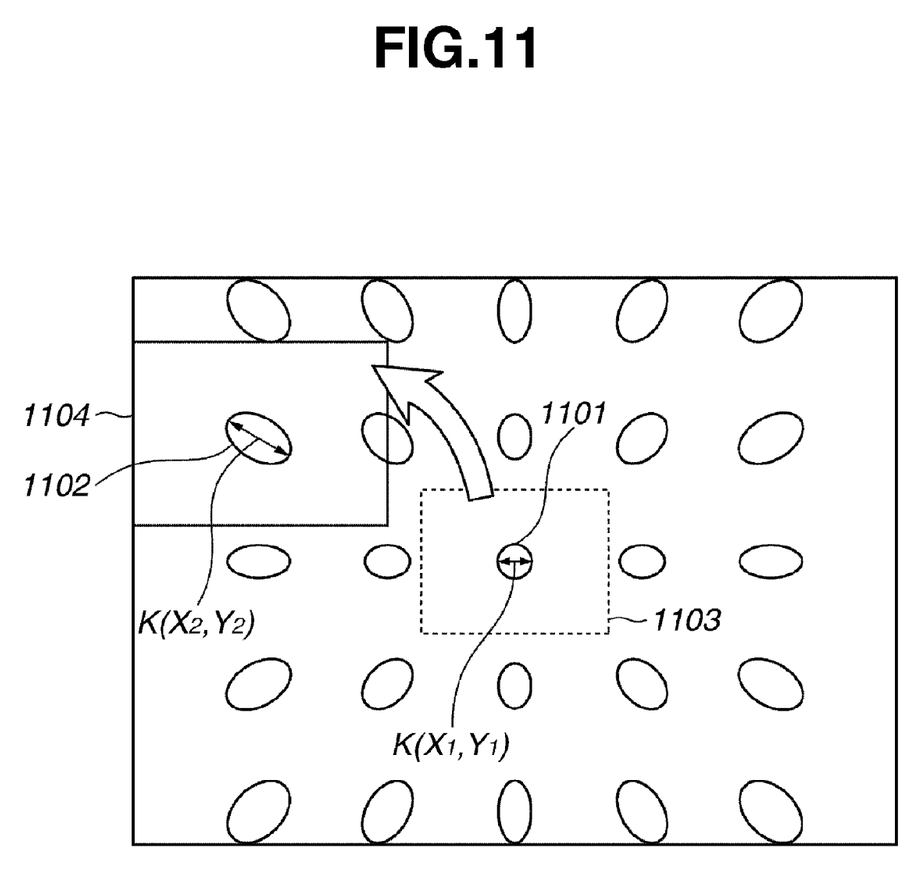
FIG. 11 illustrates exemplary circles of confusion variable depending on the pixel position on a captured image.

FIG. 11 illustrates exemplary circles of confusion variable depending on the pixel position on a captured image. The circle of confusion on a captured image is generally different in shape and size between the center of an image and a peripheral region of the image, due to the characteristics of an optical system.

If an optical system includes a fish-eye lens or other lens having a large distortion, a camera system performs processing for correcting the distortion on a captured image. However, applying the distortion correction processing to a captured image may differentiate the circle of confusion in shape and size depending on the pixel position, even if an optical system has characteristics capable of obtaining a uniform circle of confusion irrespective of a pixel position.

According to the example illustrated in FIG. 11, a circle 1101 of confusion positioned at a center coordinate $(X_1,Y_1)$ on a captured image has a correct round shape. A circle 1102 of confusion positioned at a coordinate $(X_2,Y_2)$ offset from the center has an elliptic shape. When the circle of confusion is an ellipse, the circle-of-confusion diameter is equal to the length of a major axis.

A center coordinate is regarded as a standard position for calculating a circle-of-confusion diameter on a clip image. K(x,y) represents an increment of the circle-of-confusion diameter per unit focusing amount at the coordinate (x,y) and the aperture value Ik.

In this case, the increment K(x,y) of the circle-of-confusion diameter per unit focusing amount is $K(X_1,Y_1)$ for a clip image 1103 having a center coordinate $(X_1,Y_1)$ and $K(X_2,Y_2)$ for a clip image 1104 having a center coordinate $(X_2,Y_2)$. The standard position for calculating a circle-of-confusion diameter on a clip image is not limited to the center coordinate and therefore may be a coordinate where the circle-of-confusion diameter is maximized in a clip range or a coordinate corresponding to a range-finding point on each clip image.

From the above-described relationship, a circle-of-confusion diameter Li(f) on a clip image i at the focusing position f can be expressed by the following formula (7). Furthermore, a circle-of-confusion diameter Li'(f) on an output image i at the focusing position f can be expressed by the following formula (8). Accordingly, the formula (10) can be derived from the formulas (7), (8), and (9) to calculate an overall in-focus position F. The formula (9) is a generalized form of the formula (3).

$$L_i(f) = K(x_i, y_i) \cdot |f - F_i| \quad (7)$$

$$L'_1(f) = \frac{N}{N_i} \cdot L_i(f) \quad (8)$$

$$L'_{max}(F) = L'_m(F) = L'_n(F) \quad (9)$$

$$F = \frac{N_m \cdot K(x_n, y_n) \cdot F_n + N_n \cdot K(x_m, y_m) \cdot F_m}{N_m \cdot K(x_n, y_n) + N_n \cdot K(x_m, y_m)} \quad (10)$$

Furthermore, the following formula (12) can be derived from the formulas (7) through (10) and a formula (11) to obtain a target (smallest) aperture value I so that the optical system can be focused on all of the output images. The formula (11) is a generalized form of the formula (5).

$$L''_i(f) = \frac{I_C}{I} \cdot L'_i(f) \quad (11)$$

$$I = \frac{N \cdot K(x_m, y_m) \cdot K(x_n, y_n) \cdot |F_m - F_n|}{\delta \cdot (N_m \cdot K(x_n, y_n) + N_n \cdot K(x_m, y_m))} \cdot I_k \quad (12)$$

Thus, the present embodiment can calculate the target aperture value I based on the formulas (10) and (12), if the increment K(x,y) can be obtained beforehand, in a case where a circle-of-confusion diameter on a capture image is variable depending on the pixel position.

More specifically, the present embodiment can calculate the overall in-focus position F and the target (smallest) aperture value I from the in-focus position of each clip image and the image size of each clip image.

Figure 12:
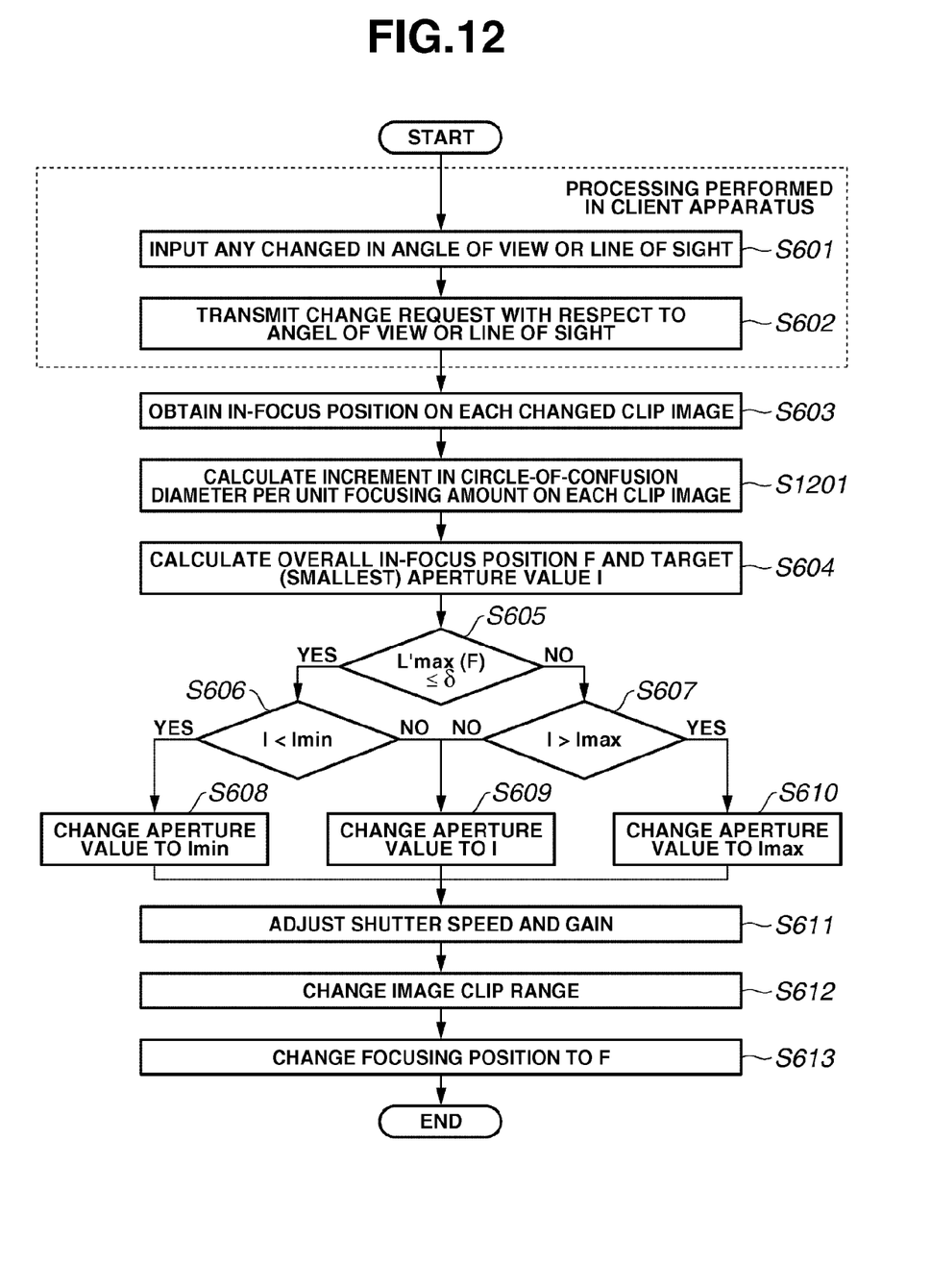
FIG. 12 is a flowchart illustrating exemplary processing performed by a camera system according to a second exemplary embodiment, when the field range has changed.

FIG. 12 is a flowchart illustrating exemplary processing performed by the camera system according to the present embodiment, where the field range has changed. The exemplary processing illustrated in FIG. 12 is basically similar to the processing of the above-described first exemplary embodiment illustrated in FIG. 6.

As illustrated in FIG. 12, immediately before calculating the overall in-focus position F and the target (smallest) aperture value I in step S604, the present embodiment calculates an increment $K(x_i,y_i)$ of the circle-of-confusion diameter per unit focusing amount on each clip image at step S1201.

Third Exemplary Embodiment

A camera system according to the third exemplary embodiment includes a client apparatus that can clip partial images from a captured image and resize each clip image. More specifically, the third exemplary embodiment has the following features different from those of the above-described first exemplary embodiment, although the rest of the third exemplary embodiment is similar to that of the first exemplary embodiment.

Figure 13:
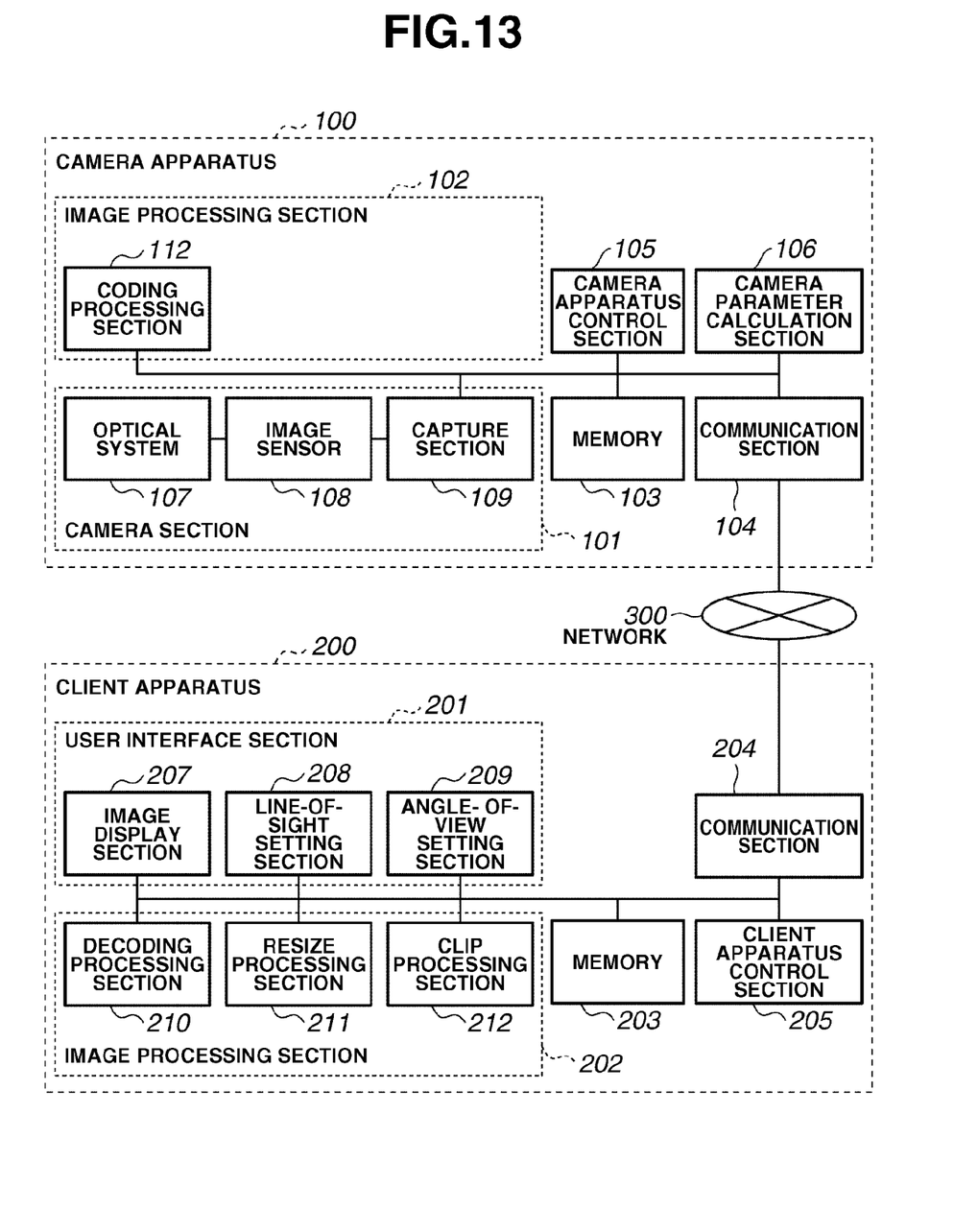
FIG. 13 is a block diagram illustrating a camera system according to a third exemplary embodiment.

FIG. 13 illustrates an exemplary camera system including a client apparatus that can clip partial images from a captured image and resize the clip images.

The camera system illustrated in FIG. 13 is different from the camera system according to the first exemplary embodiment (refer to FIG. 6) in that the camera apparatus 100 does not include the resize processing section 111 and the clip processing section 110 in the image processing section 102.

Instead, the camera system according to the present embodiment includes a resize processing section 211 and a clip processing section 212 in the image processing section 202 of the client apparatus 200. The present embodiment is similar to the first exemplary embodiment in that the camera apparatus 100 includes the camera parameter calculation section 106 that can calculate the overall in-focus position F and the target (smallest) aperture value I so that the optical system can be focused on all of the output images.

Figure 14:
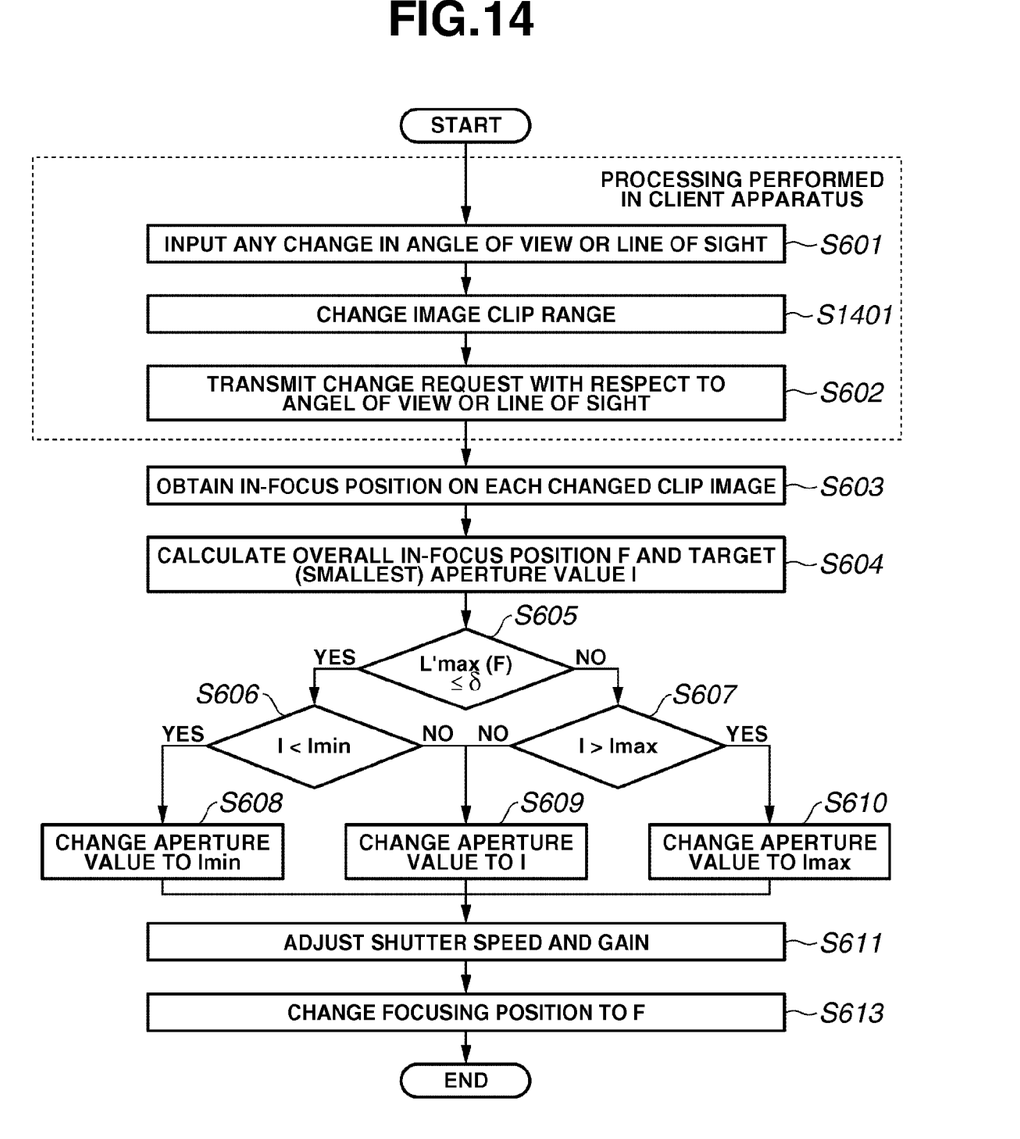
FIG. 14 is a flowchart illustrating exemplary processing performed by the camera system according to the present embodiment, when the field range has changed.

FIG. 14 is a flowchart illustrating exemplary processing performed by the camera system according to the present embodiment, when the field range has changed. The exemplary processing illustrated in FIG. 14 is basically similar to the processing of the above-described first exemplary embodiment illustrated in FIG. 6, except that the client apparatus 200 performs the clip processing.

More specifically, immediately after a line-of-sight change or an angle-of-view change is input (refer to step S601), the client apparatus 200 changes the clip range of an image in step S1401 and transmits a change request with respect to the line of sight or the angle of view via the communication section 204 to the camera apparatus 100 (refer to step S602). The exemplary processing illustrated in FIG. 14 does not include step S612 because the clip range changing processing is performed in step S1401.

Other Exemplary Embodiments

Furthermore, software program code for realizing the functions of the above-described exemplary embodiments can be supplied to a system or an apparatus including various devices. A computer (or CPU or micro-processing unit (MPU)) in the system or the apparatus can execute the program to operate the devices to realize the functions of the above-described exemplary embodiments. Accordingly, the present invention encompasses the program code installable in a computer when the functions or processes of the exemplary embodiments can be realized by the computer.

In this case, the program code itself can realize the functions of the exemplary embodiments and the storage medium storing the program code also constitutes the present invention. The equivalents of programs can be used if they possess comparable functions. Furthermore, the present invention encompasses supplying the program code to a computer with a storage (or recording) medium storing the program code. In this case, the type of program can be any one of object code, interpreter program, and OS script data.

A storage medium supplying the program can be selected from any one of a flexible (floppy) disk, a hard disk, an optical disk, a magneto-optical (MO) disk, a compact disk—ROM (CD-ROM), a CD-recordable (CD-R), a CD-rewritable (CD-RW), a magnetic tape, a nonvolatile memory card, a ROM, and a DVD (DVD-ROM, DVD-R).

The method for supplying the program includes accessing a web site on the Internet using the browsing function of a client computer, when the web site allows each user to download the computer program of the present invention, or compressed files of the programs having automatic installing functions, to a hard disk or other recording medium of the user.

Furthermore, the program code constituting the programs of the present invention can be divided into a plurality of files so that respective files are downloadable from different web sites. Namely, the present invention encompasses WWW servers that allow numerous users to download the program files so that the functions or processes of the present invention can be realized on their computers.

Next, enciphering the programs of the present invention and storing the enciphered programs on a CD-ROM or comparable recording medium is an exemplary method when the programs of the present invention are distributed to the users. The authorized users (i.e., users satisfying predetermined conditions) are allowed to download key information from a page on the Internet. The users can decipher the programs with the obtained key information and can install the programs on their computers. When the computer reads and executes the installed programs, the functions of the above-described exemplary embodiments can be realized.

Moreover, an operating system (OS) or other application software running on the computer can execute part or all of the actual processing based on instructions of the programs.

Additionally, the program code read out of a storage medium can be written into a memory of a function expansion board equipped in a computer or into a memory of a function expansion unit connected to the computer. In this case, based on an instruction of the program, a CPU provided on the function expansion board or the function expansion unit can execute part or all of the processing so that the functions of the above-described exemplary embodiments can be realized.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-155174 filed Jun. 2, 2006, which is hereby incorporated by reference herein in its entirety.

What is claimed is:

1. An imaging system capable of clipping a plurality of partial images from an image captured by an imaging apparatus, converting an image size of each clip image, and producing an output image with a converted image size, the imaging system comprising:
   a calculation unit configured to calculate an overall in-focus position based on an in-focus position of each clip image, an image size of each clip image, and an image size of each output image; and
   a focus control unit configured to perform focus control for the imaging apparatus based on the overall in-focus position calculated by the calculation unit.

2. The imaging system according to claim 1, wherein the calculation unit calculates the overall in-focus position that represents a focusing position corresponding to a smallest value in a function defining a largest value among a plurality circle-of-confusion diameters which are variable depending on a focusing position on each output image.

3. The imaging system according to claim 2, further comprising:
   an aperture calculation unit configured to calculate an aperture value so that a circle-of-confusion diameter at the overall in-focus position is equal to or less than a diameter of an allowable circle of confusion; and
   an aperture control unit configured to perform diaphragm control based on the aperture value calculated by the aperture calculation unit.

4. The imaging system according to claim 3, wherein when a pixel distance on the output image is greater than the diameter of an allowable circle of confusion on the output image, the diameter of the allowable circle of confusion is equalized to the pixel distance on the ouput image.

5. The imaging system according to claim 2, wherein when the circle-of-confusion diameter on an image is variable depending on a pixel position, the circle-of-confusion diameter of each clip image includes a change amount relative to a circle-of-confusion diameter at a calculation standard position.

6. The imaging system according to claim 5, wherein the calculation standard position is selected from the group consisting of a center pixel position of each clip image, a pixel position corresponding to a range-finding point on each clip image, and a pixel position where the circle-of-confusion diameter is maximized in each clip image.

7. The imaging system according to claim 2, wherein when a pixel distance on a clip image is greater than the diameter of an allowable circle of confusion on the clip image, the diameter of an allowable circle of confusion on the output image is calculated while the diameter of an allowable circle of confusion on the clip image is regarded as a pixel distance on the clip image.

8. An imaging apparatus capable of clipping a plurality partial images from an image, converting an image size of each clip image, and producing an output image with a converted image size, the imaging apparatus comprising:
a calculation unit configured to calculate an overall in-focus position based on an in-focus position of each clip image, an image size of each clip image, and an image size of each output image, and
a focus control unit configured to perform focus control based on the overall in-focus position calculated by the calculation unit.

9. A method for controlling an imaging apparatus capable of clipping a plurality of partial images from an image, converting an image size of each clip image, and producing an output image with a converted image size, the method comprising:
calculating an overall in-focus position based on an in-focus position of each clip image, an image size of each clip image, and an image size of each output image, and
performing focus control for the imaging apparatus based on the calculated overall in-focus position.

10. A computer storage medium storing program code instructions which, when executed by a computer, causes an imaging apparatus to clip a plurality partial images from an image, convert an image size of each clip image, and produce an output image with a converted image size, the medium comprising:
instructions for calculating an overall in-focus position based on an in-focus position of each clip image, an image size of each clip image, and an image size of each output image, and
instructions for performing a focus control for the imaging apparatus based on the calculated overall in-focus position.

* * * * *